3,108,078
STABILIZED TRICHLOROCYANURIC ACID AND
COMPOSITIONS CONTAINING SAME
Harold Eugene Wixon, Jersey City, N.J., assignor to Colgate-Palmolive Company, New York, N.Y., a corporation of Delaware
No Drawing. Filed Mar. 17, 1960, Ser. No. 15,538
15 Claims. (Cl. 252—95)

The present invention relates to an oxidizing process and product involving trichlorocyanuric acid. More particularly it relates to a process of oxidative treatment, such as bleaching or disinfecting, utilizing particulate solid trichlorocyanuric acid which has been stabilized against decomposition, as well to the process of preparing such stabilized trichlorocyanuric acid. The invention further relates to particulate solid trichlorocyanuric acid so stabilized, and to compositions containing such stabilized trichlorocyanuric acid.

In accordance with the present invention a process for oxidation of oxidizable substances comprises admixing substantially dry trichlorocyanuric acid stabilized against decomposition on storage and aging by an olefin having a double bond containing a tertiary carbon atom with an aqueous medium, and contacting said mixture with material to be oxidized. The highly efficacious nature of the instant olefins in on the one hand rendering trichlorocyanuric acid stable against decomposition on storage and aging and, on the other hand permitting such stabilized trichlorocyanuric acid to liberate readily hypochlorite chlorine when contacted with an aqueous medium, is indeed surprising and highly beneficial and permits the aforesaid process to be employed with advantage under circumstances where it is desired to have available a bleaching or similar oxidation process involving a dry solid oxidizing agent. Thus the foregoing process of the present invention is especially adapted to household oxidative bleaching of stains on ceramics, textiles, and the like.

Further in accordance with the present invention is a method of increasing the stability of solid particulate trichlorocyanuric acid which comprises treating solid particulate trichlorocyanuric acid with an olefin having a double bond containing a tertiary carbon atom, the olefin being in a diffuse form. Also within the ambit of the invention is solid particulate trichlorocyanuric acid stabilized against decomposition by an olefin having a double bond containing a tertiary carbon atom, as well as washing, bleaching, sterilizing and disinfecting compositions containing trichlorocyanuric acid so stabilized.

Trichlorocyanuric acid is a powerful oxidizing agent, possessing three labile positive chlorine atoms held only by a nitrogen-chlorine or oxygen-chlorine bond. The stabilizing action of the instant olefins on the trichlorocyanuric acid is especially surprising in view of the fact that these olefins, by virtue of their unsaturated character and reactivity with hypochlorous acid, are normally considered to be quite unstable toward trichlorocyanuric acid, which of course, readily liberates hypochlorous acid in aqueous media.

The trichlorocyanuric acid of the present invention is in dry, finely divided solid form, i.e. in a form suitable for rapid contact with or dissolution in water on admixture therewith. Typically the particle size of this trichlorocyanuric acid is such that substantially all of it passes through a 20 mesh screen. Preferably a major portion (i.e. 60–90%) thereof passes through a 200 mesh screen ("mesh" being used herein to refer to the U.S. sieve series). By means of the present invention, it is possible to stabilize solid, particulate trichlorocyanuric acid against decomposition on aging under conditions which normally cause very extensive decomposition of the acid and loss of available chlorine therefrom. Thus it is now possible to maintain a high level of available chlorine in compositions containing solid trichlorocyanuric acid over a relatively long period of time and under conditions which would otherwise cause the trichlorocyanuric acid to decompose and suffer extensive loss of available chlorine. Stabilization of trichlorocyanuric acid in accordance with the present invention has also been found to result in diminution of corrosion of metallic containers in which the trichlorocyanuric acid or compositions containing the same are stored.

As referred to above, the instant olefins have a carbon-to-carbon double bond in which one of the carbon atoms is tertiary, i.e. is directly attached to a total of 3 carbon atoms, one sharing the double bond and two others in addition. These olefins readily undergo hypochlorous acid addition, their unsaturation being not exclusively of an aromatic or benzenoid nature. The instant olefins may be cyclic or acyclic, e.g. paraffinic or cycloparaffinic, and the tertiary carbon-containing double bond may be terminal (in 1,2 position), or it may be non-terminal or part of a cyclic structure. The instant olefins are normally liquid or solid at room temperature and pressure, and it is preferred to employ those with a relatively low vapor pressure (e.g. having a boiling point at one atmosphere above about 125° C. and preferably in the range from 150–250° C.), although relatively volatile olefins may be used where sealed containers and/or volatility depressants such as mineral oil are employed.

Certain of the instant olefins, such as the hypochlorous acid-reactive unsaturated terpenes, are odoriferous and have desirable (or undesirable as the case may be) perfume characteristics. These materials occur in nature as constituents of, or indigenous to, essential oils (see Guenther, "The Essential Oils," volume II (1949)). Another group of suitable olefins, which is non-terpenic, contains many olefins which are substantially odorless in nature, and may be preferred for this reason.

Among the instant substantially odorless olefins may be mentioned polymerized isobutylene, e.g., diisobutylene, tetraisobutylene, polymerized propylene, e.g. propylene tetramer, and 5-butyl-4-nonene such as may conveniently be prepared by dehydration of tributyl carbinol. Among the suitable odoriferous terpenes are those isoprenoid hydrocarbons containing two or more, usually from two to six, isoprene units in a cyclic or acyclic structure, i.e. the term "terpene" is employed as generic to terpenes, sesquiterpenes, diterpenes, triterpenes and the like. These terpenes are unsaturated and readily undergo hypochlorous acid addition, that is their unsaturation is not exclusively of an aromatic or benzenoid nature. They may have a mono-cyclic, dicyclic, tricyclic, tetracyclic or open chain structure, specific examples of suitable such unsaturated hypochlorous acid-reactive non-benzenoid terpenes being alpha-phellandrene, p-methene-1, p-methene-3, alpha-terpinene, terpinolene, terpinyl acetate, terpineol, alpha-pinene, beta-pinene, pulegone, alloocimene, linalyl acetate, neryl acetate, geranyl acetate, camphene, and mixtures thereof including naturally occurring materials such as geraniol, pine oil, pine-needle oil, orange terpenes, and oil of cedarwood. It is preferred to employ the normally liquid polyunsaturated terpenes containing at least two isoprenoid units, such as limonene and myrcene, as these materials have been found to be effective as stabilizers in somewhat lower proportions than the mono-unsaurated terpens.

It has been found that on admixture of the instant olefin in diffuse form with the particulate solid trichlorocyanuric acid there frequently is experienced a diminution in available chlorine above and beyond that normally experienced on mixing in the absence of the olefin. This loss may vary from about 0–3% when using the minimum proportion of olefin effective to bring about stabilization, up to about 40% when using the maximum desirable amount of olefin. Thus, the instant olefins are normally employed in a minor amount sufficient to effect stabilization of the trichlorocyanuric acid but insufficient to substantially diminish the available chlorine thereof, i.e. in an amount which affords stabilization but which does not, on intial contact and mixing as set forth herein, reduce the available chlorine by more than about 40%, and preferably not more than about 15%. The exact proportion of olefin which is employed depends on the stabilizing activity of the olefin employed, which in turn is influenced by the degree of unsaturation and structure thereof. Typically the proportion of olefin employed may vary from about 1% to 40% and preferably from 5% to 20% by weight of the trichlorocyanuric acid present, higher relative amounts of olefin being used if the olefin is monounsaturated than if it has multiple non-aromatic unsaturation. It has been found, for instance, that when stabilizing trichlorocyanuric acid with an olefin such as the preferred limonene or myrcene, if substantially more than about 40% by weight thereof is employed, a loss in available chlorine as high as about 60% of the original level may occur on mixing, although the resulting mixture is relatively stable. On the other hand, at a level of terpene substantially below about 1% by weight of the trichlorocyanuric acid, the efficacy of the stabilizing action is greatly reduced.

Indicative of the specificity of action of the present system are the facts that saturated terpenes such as camphor, unsaturated benzenoid terpens such as p-cymene, and other unsaturated cyclic and acyclic materials such as cyclohexene and decene-1 fail to exert a stabilizing action on trichlorocyanuric acid, that the instant olefins stabilize trichlorocyanuric acid more effectively than they stabilize dichlorocyanuric acid, and that the olefins of the present invention exert no stabilizing action whatsoever on 1,3-dichloro-5,5-dimethyl hydantoin, an organic compound capable of liberating hypochlorite chlorine in aqueous media and also previously proposed for use in bleaching, sterilizing, disinfecting and washing compositions.

The present process for the preparation of stabilized trichlorocyanuric acid is carried out by treating solid particulate trichlorocyanuric acid under substantially dry conditions with the desired amount of olefin, the olefin being dry and being in a sufficiently diffuse form to prevent spontaneous thermal decomposition, e.g. fuming or smoking, of the trichlorocyanuric acid. Thus the olefin may be in liquid or gaseous form (preferably liquid), and may, if desired, be carried by an inert liquid, gaseous or solid carrier. For example, camphene, which is normally solid at room temperature may be dissolved in a liquid solvent carrier such as alcohol or perfume oils and atomized therein onto an inert solid carrier such as a water insoluble particulate abrasive, a water soluble spray dried detergent composition, and/or inorganic salts.

Contact of trichlorocyanuric acid with the stabilizing olefin (either per se or on a carrier) desirably is carried out in the presence of a dispersion medium, the expression "dispersion medium" referring to a means for dispersing the olefin throughout the particulate trichlorocyanuric acid so as to obtain substantial homogeneous contact of the olefin with the particles comprising the body of trichlorocyanuric acid being stabilized. Uniform, even contact of the olefin with the surface of the particles of trichlorocyanuric acid prevents undesirable extensive localized reaction between these two materials, which reaction may lead to overheating and spontaneous decomposition of the trichlorocyanuric acid. Suitable such dispersion media for controlling the contact of the olefin with the trichlorocyanuric acid include substantially dry trichlorocyanuric acid-stable water soluble or insoluble organic or inorganic solid diluents such as finely divided abrasives, anionic surface active agents and detergent salts, inorganic salts, substantially dry particulate detergent compositions such as may be prepared by heat drying an aqueous detergent composition, e.g. drum drying and spray drying, and other particulate solids inert to both trichlorocyanuric acid and the olefin. (These substances are also suitable, of course, as olefin carriers as referred to hereinabove.) Use of particulate solids as dispersion media is especially desirable in that they diminish effectively the extent of initial contact between the olefin and the trichlorocyanuric acid. they sorb the olefin at the time of addition and carry it throughout the composition and later release it to the trichlorocyanuric acid slowly and uniformly, and they inhibit uncontrolled overheating by absorbing any heat that is produced. In general it is preferred that the ratio of total inert solid diluent used as olefin carrier and/or as dispersion medium to trichlorocyanuric acid be at least about 5:1 and preferably in the range of about 100:1 to 1000:1.

Other more specific means of satisfactorily contacting trichlorocyanuric acid with the instant olefin include tumbling a trichlorocyanuric acid-containing particulate composition while spraying it with a liquid or liquefied olefin in finely divided form. Alternatively, a liquid terpene may be slurried with an inert solid diluent, the slurry may then be thoroughly dispersed throughout a larger body of substantially dry inert solid diluent, and finally the trichlorocyanuric acid may be admixed therewith.

Trichlorocyanuric acid stabilized in accordance with the present invention may be employed in any substantially dry composition in which trichlorocyanuric acid is otherwise suitable for use, such as washing, bleaching, sterilizing and disinfecting compositions. Thus it may be used in admixture with "inert diluents" including surface active agents and synthetic detergents stable in the presence of trichlorocyanuric acid. Such detergents are known to the art, and include a wide variety of anionic detergent salts such as the water soluble higher fatty acid alkali metal soaps, e.g. sodium myristate and sodium palmitate; water soluble sulfated and sulfonated anionic foaming alkali metal and alkaline earth metal detergent salts containing a hydrophobic higher alkyl moiety (typically containing from about 8 to 22 carbon atoms) such as salts of higher alkyl mono- or poly-nuclear aryl sulfonates having from about 10 to 16 carbon atoms in the alkyl group (e.g. sodium dodecylbenzene sulfonate, magnesium tridecylbenzene sulfonate, lithium or potassium pentapropylene benzene sulfonate); alkali metal salts of higher alkyl naphthalene sulfonic acids; sulfated higher fatty acid monoglycerides such as the sodium salt of the sulfated monoglyceride of coconut oil fatty acids and the potassium salt of the sulfated monoglyceride of tallow fatty acids; alkali metal salts of sulfated fatty alcohols containing from about 10 to 18 carbon atoms (e.g. sodium lauryl sulfate and sodium stearyl sulfate); alkali metal salts of higher fatty acid esters of low molecular weight alkylol sulfonic acids, e.g. fatty acid esters of the sodium salt of isethionic acid; the fatty ethanolamide sulfates; the fatty acid amides of amino alkyl sulfonic acids, e.g. lauric acid amide of taurine; as well as numerous other ionic organic surface active agents such as sodium toluenesulfonate, sodium xylenesulfonate, sodium naphthalene sulfonate; and mixtures thereof. In general these detergents are employed in the form of their alkali metal or alkaline earth metal salts as these salts possess the requisite stability, solubility, and low cost essential to practical utility.

In addition to the foregoing organic detergents various other water soluble and insoluble organic and inorganic materials may be present including, inter alia, abrasives, e.g. silica and feldspar; inorganic detergent builder salts e.g. sodium sulfate, sodium chloride, borax, sodium silicate, alkali metal orthophosphates and polyphosphates such as monosodium phosphate, disodium phosphate, trisodium phosphate, pentasodium tripolyphosphate and tetrasodium pyrophosphate; acid salts such as sodium bisulfate or dry organic and inorganic acids such as tartaric, citric, and sulfamic acids; anticaking agents such as bentonite and magnesium silicate; anti-redeposition agents such as sodium carboxymethyl cellulose; optical or fluorescent brighteners; ethylene diamine tetra-acetic acid and its salts; foam and detergency improving adjuvants such as higher fatty amides and higher fatty alkylolamides; and desiccants such as calcium chloride and magnesium sulfate; in addition to other materials inert to trichlorocyanuric acid. The pH of dilute aqueous solutions or slurries of these compositions is normally within the range of 3 to 12, and is preferably 7–10.

The present compositions normally contain a minor proportion (e.g. 0.1 to 20%) of trichlorocyanuric acid and the instant olefin (in proportion in accordance with this disclosure), and a major proportion (i.e. the balance of the composition) of a diluent inert to trichlorocyanuric acid such as the foregoing materials. These compositions are substantially dry, i.e. are solid compositions which are dry to the touch and which are substantially completely devoid of free or uncombined moisture. In this connection, it is preferred that the wetting and detergent compositions containing the instant stabilized trichlorocyanuric acid also contain a substantial proportion of hydratable inorganic salt such as incompletely hydrated, i.e. anhydrous or partially hydrated, inorganic alkaline salt. Examples of such salts are pentasodium tripolyphosphate, tetrasodium pyrophosphate, trisodium orthophosphate, sodium sulfate, and the like, pentasodium tripolyphosphate being preferred because of its considerable capacity and affinity for moisture, i.e. its low vapor pressure. Thus a typically preferred formulation will contain hydratable inorganic salt and any moisture therein (as determined by azeotropic distillation with xylol using the Dean and Stark apparatus, ASTM method D–460-54, or by the Karl Fischer titration method) will be less than that moisture which can be strongly retained in an inactive form as the hydrate of the hydratable inorganic salt. The hydratable salt may be employed in any desired amount, and typically may constitute from about 1% to 90% or more of the present compositions.

In order to maintain stabilized trichlorocyanuric acid in substantially dry condition it is desirable that it, or compositions containing it, be packaged in moisture impermeable containers, e.g. containers fabricated from glass, metal or metal foil, metal foil covered paperboard being preferred in view of its light weight and resilient character.

Preferably, the instant compositions containing stabilized trichlorocyanuric acid are prepared in particulate form having an average particle size of less than about 10 mesh, the exact size depending on the intended use of the product. For example, in the case of abrasive cleansers the particle size preferably is less than about 100 and preferably less than about 200 mesh, whereas in the case of spray dried compositions, the particle size typically may be such that substantially the entire product passes through a 10 mesh sieve but is retained on a 100 mesh sieve.

Thus a substantially dry abrasive cleanser prepared in accordance with the present invention comprises minor proportions of trichlorocyanuric acid and an olefin having a double bond containing a tertiary carbon atom, and a major proportion of a finely divided water insoluble siliceous abrasive such as silica, feldspar, pumice, volcanic ash, diatomaceous earth, bentonite, talc and mixtures thereof. The olefin is present in a small but sufficient amount to stabilize the trichlorocyanuric acid, up to about 40% thereof, and preferably the trichlorocyanuric acid constitutes about 0.1 to 10% by weight of the composition. Desirably the cleanser also contains from 60% to 95% by weight of abrasive, about 0.5 to 15% by weight of an organic detergent stable in the presence of the trichlorocyanuric acid, and optionally, up to about 25% by weight of inorganic builder salt or salts such as those referred to hereinabove.

A preferred substantially dry water soluble bleaching detergent composition in accordance with the present invention comprises at least about 5% and desirably 15–40% anionic organic foaming detergent, 0.1–10% of trichlorocyanuric acid, the instant olefin being present in an amount sufficient to stabilize the trichlorocyanuric acid up to 40% thereof, 0–2% of a fluorescent brightener (preferably one resistant to decomposition by trichlorocyanuric acid or aqueous solutions thereof), and hydratable inorganic builder salt as the balance, e.g. about 50–95% thereof.

In carrying out the present process for oxidation of oxidizable substances, e.g., in bleaching and washing stained and/or soiled fibrous products such as fabrics, garments, household laundry and the like, the present stabilized trichlorocyanuric acid or water soluble compositions containing the same are dissolved in water prior to contact with the textile to be bleached in order to avoid uneven or localized bleaching or fiber damage which may result if the dry trichlorocyanuric acid is in contact with the textile at the time the acid is contacted with and dissolved in water to liberate aqueous hypochlorite chlorine. Typical suitable concentrations of solutions of the present stabilized trichlorocyanuric acid or compositions containing the same are those which contain from about 0.005% to about 15% by weight of trichlorocyanuric acid, depending on the intended use of the solution. Thus the preferred oxidative bleaching and washing process comprises commingling the stabilized trichlorocyanuric acid or composition containing the same with water in an effective bleaching concentration, and contacting the resulting aqueous mixture with textile to be bleached. Oxidation or bleaching is most effective if the textile is contacted with the solution immediately upon contact of the water soluble composition with the aqueous medium, i.e. within about three minutes thereafter. The present oxidative treatment also may be accomplished by immersion of the textile in an aqueous medium prior to dissolution therein of the instant stabilized trichlorocyanuric acid.

In the case of stained or solid surfaces such as stained ceramics where localized contact with a highly concentrated solution of trichlorocyanuric acid is unlikely to cause damage, it is satisfactory to deposit the stabilized trichlorocyanuric acid or composition containing the same on the solid surface to be treated, and to then add water thereto in an amount sufficient to form a paste or slurry, whereby the steps of admixing with water and contacting the mixture with material to be oxidized occur simultaneously.

The following examples are given to additionally illustrate the nature of the invention and it will be understood that the invention is not limited thereto. All parts or percentages are by weight unless otherwise indicated, and references to moisture content denote total moisture as determined using the Karl Fischer titration method or by xylol distillation in accordance with ASTM method D–460-54. The components used are substantially completely dry or anhydrous unless otherwise indicated.

EXAMPLE I

A water soluble washing composition having substantial bleaching power and suitable for use on heavily soiled fabrics is prepared by spray drying an aqueous slurry to form a granular product having a particle size such that 95% of the granules pass through a 20 mesh sieve (sieve opening 0.84 mm.). The granular product has the following composition:

| | Parts by weight |
|---|---|
| Sodium dodecyl benzene sulfonate | 35.5 |
| Pentasodium tripolyphosphate | 39.0 |
| Moisture | 3.0 |
| Sodium carboxymethylcellulose | 0.8 |
| Bleach resistant optical brightener, rancidity retardant, and antitarnishing agent | 0.6 |

Sodium sulfate, balance to 98.57 parts.

These granules are tumbled in a rotating drum and sprayed with 0.14 part by weight (based on the final composition) of limonene. Thereafter 1.29 parts by weight of trichlorocyanuric acid are added slowly and are thoroughly admixed therewith. The trichlorocyanuric acid employed has a particle size such that at least 80% passes through a 100 mesh sieve (sieve openings 0.149 mm.).

The product, which by analysis is found to contain 1.00% available chlorine, is then packaged in aluminum foil-covered paper board containers. After standing under room conditions for 8 months, there is substantially no diminution in the available chlorine content of the product. A control, which does not form part of this invention, prepared in the same way except that the limonene is omitted, loses two thirds of its initial content of available chlorine within six months' aging under the same conditions.

In use, approximately nine pounds of soiled color-fast household laundry including cottons and nylons stained by ink, tea, coffee, and grape juice is placed in a conventional household automatic washing machine, the machine is filled with water to its customary working level, and the water soluble composition of this example is then introduced added to the water in an amount such as to form a 0.2% solution having a pH of 9.0. The composition dissolves readily and liberates hypochlorite chlorine in a highly effective manner and at a desirable rate. The laundry is washed and rinsed by the machine in the conventional manner. On inspection of the fabrics at the end of the cycle, it is found that they are evenly and effectively bleached and cleaned, the stains are removed, and there is virtually no deterioration of the fibers either locally or generally.

A detergent having greater bleaching power than that of the foregoing example may be prepared by increasing the proportions of limonene and trichlorocyanuric acid therein to 0.5% and 14.2% respectively by weight of the final product. If desired, camphene may be employed in place of limonene, in which case the camphene may be dissolved in ethanol to obtain a liquid form suitable for spraying on the spray dried granules.

EXAMPLE II 0.040 part of limonene is thoroughly mixed in a ribbon mixer at room temperature with 92.705 parts of dry silica having a particle size such that 88% thereof passes through a 200 mesh sieve. The body of inert silica solids readily absorbs the liquid limonene. To this mixture is added 6.855 parts of a spray dried and pulverized free-flowing particular detergent composition having the following analysis:

| | Percent |
|---|---|
| Sodium dodecyl benzene sulfonate | 54 |
| Pentasodium tripolyphosphate | 29 |
| Sodium silicate ($Na_2O/SiO_2=1/2.35$) | 5 |
| Sodium sulfate | 7 |
| Moisture | 5 |

The particulate detergent composition has a particle size such that over 95% thereof passes through a 20 mesh screen and over 50% thereof passes through a 100 mesh screen.

The detergent composition is thoroughly commingled with the mixture of silica and limonene in the ribbon mixer, and then 0.40 part of trichlorocyanuric acid containing about 88% available chlorine are slowly added to the mixture in the mixer and thoroughly dispersed therein. The particle size of the trichlorocyanuric acid employed is such that 60% thereof passes through a 200 mesh screen.

While there is no noticeable loss of chlorine (in the form of a gas) during mixing of the trichlorocyanuric acid with the terpene-containing abrasive, analysis for available chlorine in the final composition immediately after mixing shows that the composition of this example contains about 8% less total available chlorine than theoretically should be present, based on the initial available chlorine content of the trichlorocyanuric acid which is added. (Analysis of a similarly prepared mixture from which the limonene is omitted shows that such a mixture contains about 6% less available chlorine than the calculated theoretical level.)

This scouring cleanser has a pH in 1% aqueous slurry of 9.2.

In use, the dry powdered product of this example is sprinkled directly on a dry, stained and soiled ceramic surface. The surface is then scoured with a wet cloth. During scouring the cleanser lathers well and bleaches and cleanses the soiled ceramic surface easily and quickly. The cleanser is also highly effective when the ceramic surface is wetted with water prior to application of the scouring powder thereto, and when the scouring powder is applied directly to the cloth used for scouring.

The stabilizing action of the terpene on the trichlorocyanuric acid present in the composition of this example is conveniently shown by an accelerated aging test in which the scouring cleanser is held in sealed glass containers at 140° F. for three days. During this aging period the available chlorine content of the composition of this example does not diminish at all, whereas that of a similarly prepared composition from which unsaturated hypochlorous acid-reactive terpene has been omitted diminishes to about one third of its initial level.

The order of mixing employed in this example may be varied if desired. Table I below illustrates the results obtained, on accelerated aging under the foregoing conditions, with compositions prepared by mixing the above constituents in varying sequences.

*Table I*

| Run | Order of Addition | Loss of Available Chlorine, Percentage | |
|---|---|---|---|
| | | During Initial Mixing | During Aging |
| A | Silica+Trichlorocyanuric acid+Limonene+Detergent. | 6 | 0 |
| B | Silica+Limonene+Detergent+Trichlorocyanuric acid. | 8 | 0 |
| C | Silica+Limonene+Trichlorocyanuric acid+Detergent. | 3 | 0 |
| Control | Silica+Trichlorocyanuric acid+Detergent. | 6 | 63 |

The limonene in the foregoing example may be replaced by an equal quantity of myrcene or terpineol or by 0.08% by weight of cedrene, allo-ocimene, or alpha pinene (making an appropriate adjustment in the proportion of silica present).

EXAMPLE III 249.805 parts of dry silica having a particle size such that 99% thereof passes through a 200 mesh sieve (sieve opening 0.074 millimeter) are mixed (by tumbling) with 9.000 parts of anhydrous trisodium phosphate and 20.175 parts of a spray dried detergent composition consisting of 55.0% sodium dodecyl benzene sulfonate, 5.0% sodium silicate, 38.0% sodium sulfate, 1.25% moisture, and, as the balance, unsulfonated organic material and preservative.

In a separate container, 10 parts of the above-described silica are thoroughly mixed with 0.120 part of 5-butyl-4-nonene. This dispersion of stabilizing olefin in finely divided silica is then incorporated in and thoroughly distributed throughout the previously prepared mixture of silica and detergent.

In another separate container, 0.900 part of trichlorocyanuric acid is thoroughly mixed with 10 parts of the foregoing silica. This trichlorocyanuric acid-carrying silica is then added to the olefin-containing composition and is uniformly mixed therewith by tumbling. This composition is completely stable on exposure to 140° F. for 7 days in sealed glass containers. In contrast, a similar control composition from which the olefin has been omitted (and which, therefore, does not form part of this invention), substantially completely decomposes under these conditions.

In place of 5-butyl-4-nonene, a propylene tetramer or tetraisobutylene may be employed with the same results.

EXAMPLE IV

This example illustrates stabilization of trichlorocyanuric acid by means of the unsaturated hypochlorous acid-reactive terpenes which may also be employed as perfume constituents. As a source of unsaturated terpene there is employed a perfume which contains 14% of cedarwood, 20% Siberian pine oil, and 15% steam distilled pine oil, each of which contains a high proportion of unsaturated hypochlorous acid-reactive terpenes. The remaining constituents of the perfume are principally iso bornyl acetate and gum benzoin siam absolute.

A stabilized composition is compounded with this perfume according to the following formulation:

|  | Percent |
|---|---|
| Ground silica, average particle size finer than 200 mesh openings | 89.08 |
| Perfume (see above) | 0.10 |
| Detergent composition | 10.57 |
| Trichlorocyanuric acid, particle size finer than 30 mesh openings | 0.25 |

The detergent composition employed is spray dried, having an average particle size smaller than 10 mesh (2 mm.) and consists essentially of about 35% sodium dodecyl benzene sulfonate, 40% pentasodium tripolyphosphate, about 7% sodium silicate, about 7% moisture, and the remainder is principally sodium sulfate with a small amount of carboxymethylcellulose, fluorescent dye, rancidity preservative, and antitarnishing agent.

The composition of this example is compounded by triturating the perfume in a portion of the silica using a mortar and pestle. The perfume-carrying portion of the silica is then mixed with the main body of silica and the entire mass is agitated until the perfume is uniformly dispersed throughout the silica. Thereafter the detergent and the trichlorocyanuric acid are added to the mixture and likewise are thoroughly mixed therewith until a uniform, homogeneous composition suitable for use as an abrasive cleanser is obtained.

The foregoing composition is packed in commerical scouring powder cans, e.g. laminated paper cylinders covered with aluminum foil and having lacquered tin-plated steel tops and bottoms, the tops being provided with the usual knock-out or punch plugs. These containers are stored for 4 weeks at 90° F. and 90% relative humidity. Analyses for available chlorine at the start and at the end of the test show that the composition of this example loses slightly less than half as much available chlorine as does a similarly compounded composition from which the foregoing perfume has been omitted.

If the proportion of perfume employed in this example is reduced to 0.05%, similar satisfactory results are obtained.

EXAMPLE V

Suitable abrasive cleansers prepared according to the procedure set forth in Example I have the following composition:

| | |
|---|---|
| Trichlorocyanuric acid | 1.00%. |
| Detergent composition of Example IV | 10.57%. |
| Pentasodium tripolyphosphate | 3.03%. |
| Terpene-containing perfume of Example IV | 0.1, 0.15, 0.2 and 0.3%. |
| Finely ground silica of Example II | Q.s. to 100%. |

These compositions may be prepared in accordance with the procedure of Example II, the pentasodium tripolyphosphate being added after the perfume has been thoroughly dispersed throughout the entire body of silica.

EXAMPLE VI

An acid scouring cleanser has the following composition:

| | |
|---|---|
| Trichlorocyanuric acid | 0.250 |
| Detergent [1] | 4.350 |
| Bentonite | 2.000 |
| Tartaric acid | 5.000 |
| Terpene-containing perfume of Example IV | 0.075 |
| Silica of Example IV | 88.325 |

[1] The detergent contains 85% sodium dodecyl benzene sulfonate, 10% sodium sulfate, and 5% moisture.

This cleanser is prepared by a procedure similar to that of Example IV by first dispersing the terpene-containing perfume in the silica, and thereafter dispersing therein the detergent, the bentonite, and tartaric acid in that order, and lastly the trichlorocyanuric acid.

The scouring cleanser has a pH in 1% aqueous slurry of about 3.

The 5% of tartaric acid employed in the formulation of this example may be replaced by 3% of sulfamic acid, making an appropriate increase in the silica content.

EXAMPLE VII

A water soluble washing and bleaching composition is prepared by mixing 7.5 parts of trichlorocyanuric acid with 91.75 parts of the following detergent composition:

| | Percent |
|---|---|
| Tetrasodium pyrophosphate | 32.8 |
| Sodium dodecyl benzene sulfonate | 2.48 |
| Sodium toluene sulfonate | 5.0 |
| Fluorescent dye | 0.12 |
| Sodium sulfate | 58.6 |
| Moisture | 1.0 |

The trichlorocyanuric acid is a particulate solid having an average particle size smaller than 200 mesh (0.074 mm. diameter), and the detergent composition constitutes hollow beads formed by spray drying, the beads having a particle size such that substantially all of them pass through a 40 mesh sieve.

The spray dried product and the trichlorocyanuric acid are mixed in a twin-shell blender until the trichlorocyanuric acid is uniformly distributed throughout the mixture, as shown by the fact that the available chlorine content of three samples taken from the mixture at random are within 5% of each other, e.g. about 28 minutes.

The mixture is then sprayed with 0.75 part of limonene and is then mixed again in the twin-shell blender for ten minutes.

On the basis of the available chlorine content of the trichlorocyanuric acid employed, it is calculated that the product should contain 6.68% available chlorine. Analysis discloses that it contains 5.45%, the loss on mixing being $$\frac{6.68-5.45}{6.68} \times 100 = 18.5\%$$

On accelerated aging in sealed glass jars for three days, the available chlorine content of the product diminishes to 5.20%, a loss of $$\frac{5.45-5.20}{5.45} \times 100 = 4.6\%$$

The pH of a 1% solution of the composition of this example is 8.0. The composition is useful per se for bleaching and washing and also as a bleaching adjuvant with a conventional detergent composition.

EXAMPLE VIII

A water soluble textile bleaching and washing composition for use in cleansing stained and heavily soiled fabrics is prepared by spray drying an aqueous slurry to form a substantially dry granular product having a particle size such that 95% of the granules pass through a 20 mesh sieve (sieve opening 0.84 mm.). The resulting free flowing substantially dry product has the following composition:

| | Parts by weight |
|---|---|
| Sodium tridecyl benzene sulfonate | 27.00 |
| Pentasodium tripolyphosphate | 38.50 |
| Sodium silicate | 7.00 |
| Sodium carboxymethyl cellulose | 0.40 |
| Bleach resistant optical brightener | 0.09 |
| Antitarnishing agent for German silver | 0.10 |
| Moisture | 4.00 |

Sodium sulfate, balance to 96.48 parts.

The moisture present in the spray dried beads is in the form of hydrates of the inorganic salts, the pentasodium tripolyphosphate alone being capable of combining with water of crystallization in an amount equal to 12% by weight of the product.

The spray dried granules are tumbled in a rotating drum and sprayed with 0.14 part of perfume and 0.16 part of d-limonene. Thereafter 3.22 parts by weight of trichlorocyanuric acid is added slowly and is thoroughly dispersed through the product. The trichlorocyanuric acid employed has a particle size such that 80% thereof passes through a 100 mesh sieve (sieve openings 0.149 mm.).

This application is a continuation-in-part of my copending application Serial Number 728,069, filed April 14, 1958, and now abandoned.

While there has been disclosed that which at present is considered to be the preferred embodiment of the invention, it will be understood, of course, that changes, modifications and substitutions may be made therein without departing from the true scope of the invention as defined in the appended claims.

What is claimed is:

1. Substantially dry solid particulate trichlorocyanuric acid stabilized against decomposition by an olefin having a double bond containing a tertiary carbon atom, said olefin being present in a small but sufficient amount to stabilize said trichlorocyanuric acid up to about 40% by weight thereof.

2. Substantially dry solid particulate trichlorocyanuric acid stabilized against decomposition by an olefin as set forth in claim 1, said olefin being substantially odorless.

3. Substantially dry solid particulate trichlorocyanuric acid stabilized against decomposition by an unsaturated hypochlorous acid-reactive terpene, said terpene being present in a small but sufficient amount to stabilize said trichlorocyanuric acid up to about 40% by weight thereof.

4. Substantially dry solid particulate trichlorocyanuric acid stabilized against decomposition by 5 to 40% by weight thereof of limonene.

5. The method of increasing the stability of solid particulate trichlorocyanuric acid which comprises contacting solid particulate trichlorocyanuric acid with from 1 to 40% by weight thereof of an olefin having a double bond containing a tertiary carbon atom in the presence of from about 5 to about 1000 parts, per part of trichlorocyanuric acid, of a particulate solid diluent inert towards said trichlorocyanuric acid and said olefin, said diluent being in physical contact with said trichlorocyanuric acid and said olefin selected from the group consisting of water insoluble abrasives, water soluble inorganic salts, water soluble anionic organic detergents, and mixtures thereof.

6. The method of claim 5 wherein said diluent is a water insoluble siliceous abrasive.

7. The method of claim 5 wherein said diluent is a water soluble anionic organic detergent.

8. A water soluble textile bleaching and detergent composition consisting essentially of about 0.1 to 10% of trichlorocyanuric acid stabilized against decomposition by about 1 to 40% thereof of an olefin having a double bond containing a tertiary carbon atom, about 5 to 40% of a water soluble anionic organic detergent salt stable towards trichlorocyanuric acid, and about 50 to 95% of a hydratable inorganic builder salt.

9. A water soluble textile bleaching and detergent composition as set forth in claim 8 wherein said olefin is a hypochlorous acid-reactive unsaturated terpene.

10. A water soluble textile bleaching and detergent composition as set forth in claim 8 wherein said olefin is substantially odorless.

11. A water soluble textile bleaching and detergent composition as set forth in claim 8 wherein said organic detergent is a water soluble anionic detergent salt selected from the group consisting of alkali metal and alkaline earth metal salts of alkyl aryl sulfonic acids.

12. A substantially dry abrasive composition capable of liberating hypochlorite chlorine on contact with water consisting essentially of at least about 60% by weight of water insoluble siliceous abrasive, about 0.1 to 10% by weight of trichlorocyanuric acid, an olefin having a double bond containing a tertiary carbon atom, said olefin being present in a small but effective amount to stabilize said trichlorocyanuric acid up to about 40% by weight thereof and 0.5 to 15% by weight of a water soluble anionic organic detergent salt stable towards trichlorocyanuric acid.

13. An abrasive composition as set forth in claim 12 which contains a water soluble anionic detergent selected from the group consisting of sulfate and sulfonate detergent salts.

14. A substantially dry abrasive composition as set forth in claim 12 wherein said olefin is an unsaturated hypochlorous acid-reactive terpene.

15. An abrasive composition as set forth in claim 14 wherein the terpene is limonene.

References Cited in the file of this patent

UNITED STATES PATENTS

| 2,105,407 | Clark | Jan. 11, 1938 |
| 2,607,738 | Hardy | Aug. 19, 1952 |

FOREIGN PATENTS

| 208,587 | Australia | June 3, 1957 |